Aug. 15, 1961 P. M. CUNNINGHAM 2,996,678
ISO-ECHO CIRCUITRY FOR WEATHER RADAR
Filed Jan. 14, 1960
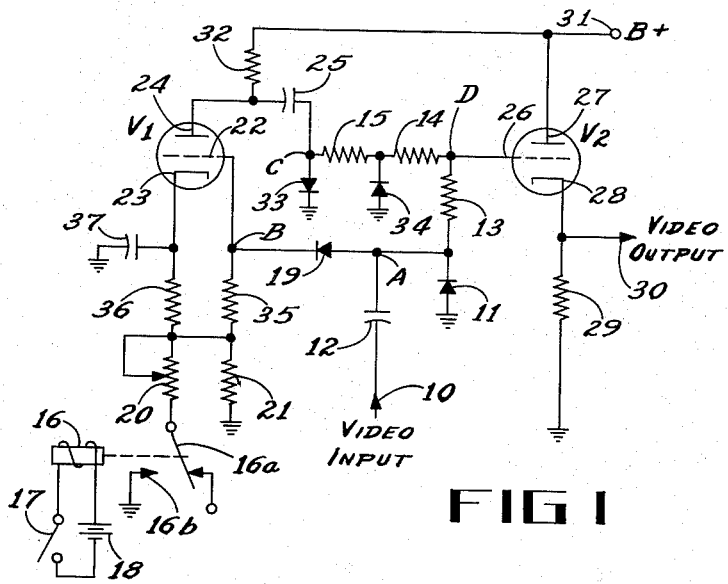
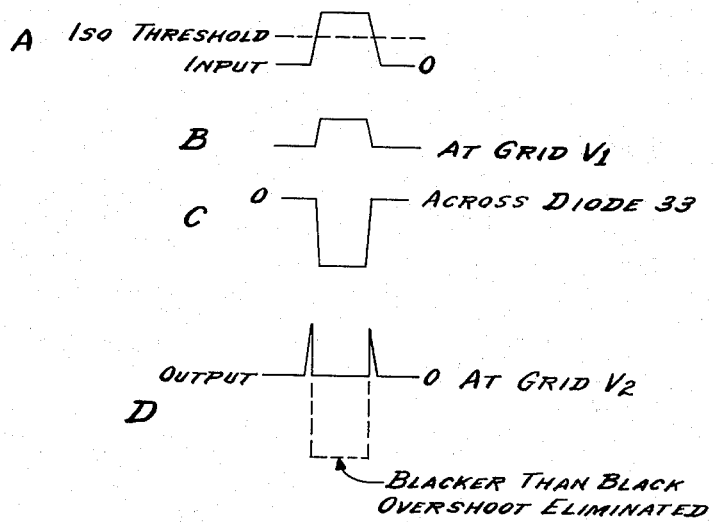
INVENTOR.
PAUL M. CUNNINGHAM United States Patent Office 2,996,678
Patented Aug. 15, 1961

2,996,678
ISO-ECHO CIRCUITRY FOR WEATHER RADAR
Paul M. Cunningham, Dallas, Tex., assignor to Collins Radio Company, Cedar Rapids, Iowa, a corporation of Iowa
Filed Jan. 14, 1960, Ser. No. 2,492
5 Claims. (Cl. 328—143)

This invention relates generally to weather radar circuitry and more particularly to an improved means of realizing an iso-echo arrangement for incorporation with a weather radar display. Weather radar devices present an indication of precipitation levels and generally incorporate a P.P.I. type of presentation wherein the precipitation level of a given searched area is presented graphically upon the viewing screen as signal returns of varying intensity in proportion to the degree of precipitation encountered by the searching beam.

Means have been employed in the art whereby iso-echo arrangements are incorporated, which effect cancellation of returns exceeding a given threshold and thereby permit distinguishing areas of relatively intense precipitation from those of lesser intensity.

In known iso-echo arrangements for weather radars, the application of the iso effect ofttimes causes an overshoot into the blacker-than-black portion of the video signal and the incorporation of conventional direct-current restorers tend to follow this overshoot and clamp the video signal at the most negative portion. These arrangements have the effect of causing an undesirable smear on the scope presentation. It is to be realized that in the presentation of a video signal to a cathode ray type of presentation very rigid controls must be maintained over the direct-current level of the video signal since the resulting contrast is directly affected by the direct-current level, since the direct-current level is in essence the background upon which the radar information is presented.

In the application of iso-echo arrangements in a weather radar which may incorporate a direct view storage tube, the maintenance of an exacting direct-current level is even more stringent than with conventional cathode ray tubes. Direct view storage tubes are well known in the art and need not be described in detail herein. It suffices to state that use of such tubes will result in a very undesirable and distorting smear in the video presentation should the video signal contain overshoots into the blacker-than-black area and conventional direct-current restoration be employed wherein the video signal is clamped at the most negative portion of the video signal.

It is object of the present invention, therefore, to provide a circuit incorporating an iso-echo arrangement wherein an elimination of overshoot into the blacker-than-black video region is inherently realized.

A further object of the present invention is the provision of an iso-echo circuit for weather radar wherein the iso threshold may be varied throughout a considerable range and wherein input video signals exceeding the preselected iso threshold may be completely eliminated from the output video signal while maintaining a rigid control over the output direct-current level so as to prevent overshoots into the blacker-than-black region of the video signal.

Still a further object of the present invention is to provide an iso-echo arrangement for weather radar wherein exacting control of the iso effect is maintained with a comparatively simple circuit.

These and other objects of the present invention will become apparent upon reading the following description in conjunction with the accompanying drawings, in which:

FIGURE 1 is a schematic representation of the iso-echo circuit of the present invention; and, FIGURE 2 is a graphical representation of waveforms associated with the circuit of FIGURE 1.

With reference to FIGURE 1, the iso-echo circuitry of the present invention is seen to comprise first and second electron discharge devices V1 and V2. The plate 24 of tube V1 is connected to a source 31 of B+ voltage through load resistor 32. The plate 27 of tube V2 is connected to the B+ voltage source 31. Tube V2 functions as a cathode follower and the cathode 28 thereof is returned to ground through resistance 29. The video output signal is taken from the cathode 28 of tube V2 at output terminal 30. The grid 22 of tube V1 is returned to ground through resistances 21 and 35. The cathode 23 of tube V1 is by-passed to ground through capacitor 37 and connected through resistance 36 and variable resistance 20 to the movable contact 16a of a control relay 16. The junction between resistances 36 and 20 is connected to the junction between resistances 21 and 35. Control relay 16 might then be operated by the closing of a control switch 17 to complete the circuit for an energizing source 18 through the control winding of the relay. When the relay 16 is energized, contact 16a thereof is connected through fixed relay contact 16b to ground.

The plate 24 of tube V1 is connected through a capacitor 25 and diode 33 to ground, the cathode of diode 33 being the grounded terminal. The junction between capacitor 25 and diode 33 is connected through resistors 15 and 14 to the grid 26 of tube V2. A second diode 34 is connected with grounded anode to the junction between resistors 15 and 14. Third and fourth diodes 19 and 11 are serially connected with like polarization between the grid 22 of tube V1 and ground with the anode of diode 11 being grounded. The grid 26 of tube V2 is connected to the junction between diodes 11 and 19 through a resistance 13. Video input signal is applied through a capacitor 12 to the junction between resistance 13 and diodes 11 and 19.

In operation, video input signal is applied to terminal 10. Diode 11 in conjunction with capacitor 12 clamps the incoming video signal from terminal 10 to ground and the resultant positive-going video appears across the voltage divider comprised of resitors 13, 14, and 15, which voltage divider is grounded through diode 33 for positive signals. Output is taken from the junction of resistors 13 and 14 and applied to the grid 26 of tube V2.

When relay 16 is unenergized, as illustrated, the bias at the cathode of diode 19 is more positive than the largest video signal appearing at junction point A, and the iso-echo circuit is inoperative. Under this condition the output video signal is an attenuated version of the input video signal. The positive bias for the cathode of diode 19 is developed from the voltage drop through resistors 36 and 21 between the cathode 23 and tube V1 and ground. Now, if control switch 17 were closed so as to energize relay 16, the movable contact 16a of relay 16 is connected to fixed contact 16b and ground, thus placing variable resistance 20 in parallel with resistance 21 such that the cathode bias for diode 19 is less positive and the resulting less positive cathode bias determines a threshold of iso-echo operation. This threshold is controlled by the particular setting of variable resistance 20. The portion of the clamped video signal at junction point A, which is more positive than the resulting positive cathode bias on diode 19 as determined by the setting of variable resistance 20, is applied to the grid 22 of tube V1 and is amplified by tube V1. The inverted amplified portion of the incoming video signal exceeding the iso threshold as it appears at the plate 24 of tube V1 is clamped to ground by diode 33 and capacitor 25 in the plate circuit of tube V1. The output pulse from tube V1 is applied across the voltage divider comprised of resistances 13, 14, and 15 and opposes the positive video signal as applied through the voltage divider from input terminal 10. At the grid 26 of tube V2 the positive video signal as it appears at junction point A may be canceled to zero if the negative video signal from the plate of tube V1 is sufficiently large. With the arrangement of the present invention, inversion of the video signal as applied to the grid of tube V2 is prevented by the conduction of diode 34. Thus, the amplified inverted portion of the input video signal exceeding the preselected iso threshold may be made sufficiently large to completely cancel the corresponding portion of the positive-going input video signal. No danger of overshoot is possible since diode 34 will conduct and clamp the signal appearing at the grid 26 of tube V2 to ground. In actual operation, diode 34 conducts at a very slight negative voltage since diodes inherently are not perfect. However, the voltage at the grid 26 of tube V2 will be essentially zero due to the voltage drop across resistor 14, which is itself smaller than resistors 15 or 13.

The operation of the iso-echo circuitry is shown graphically by the waveforms in FIGURE 2. Waveform A shows the input video signal as it appears at junction point A in FIGURE 1 and is seen to be a positive-going signal due to the ground clamping action of capacitor 12 and diode 11. The iso threshold is illustrated in waveform A as a dotted line and, as previously described, is established by the particular bias applied to the cathode of diode 19 by adjustment of variable resistance 20 in the cathode circuit of tube V1. As previously described, the portion of the video input signal at junction point A exceeding the iso threshold level is applied through diode 19 to the grid 22 of tube V1. Waveform B of FIGURE 2 illustrates the portion of waveform A exceeding the iso threshold which would be applied to the grid 22 of tube V1. Waveform B is amplified by tube V1 and appears across diode 33 as a negative-going wave again clamped to ground through the action of capacitor 25 and diode 33. The waveform C is applied through the voltage divider comprised of resistances 13, 14, and 15, and is grounded through diode 11. Thus, negative-going waveform C, which corresponds to the portion of the input video signal above the iso threshold, is applied to the voltage divider in opposition to the input video signal as illustrated in waveform A. The result is a differential cancellation at the grid 26 of tube V2 of that portion of the input video signal exceeding the iso threshold. As previously described, the differential combination of waveforms A and C should not result in a blacker-than-black overshoot as illustrated by the dotted portion of waveform D. However, due to the action of diode 34, this overshoot is eliminated since diode 34 will conduct for application of negative voltages and the voltage at the grid 26 of tube V2 will be essentially zero as illustrated by the solid line in waveform D. The resultant output taken from terminal 30 is of the same form as waveform D since tube V2 is illustrated as a cathode follower arrangement and the waveform D is seen to be that of the input video signal of waveform A with the portion thereof exceeding the iso threshold eliminated. Thus, with the arrangement shown, it is possible through judicious choice of circuit components to so amplify the portion of the input video signal exceeding the iso threshold that the inverted version of this portion, as illustrated in waveform C, may exceed in amplitude the most positive portion of the input video signal. Thus, a complete cancellation of the video signal exceeding the iso threshold may at all times be realized. This complete cancellation may be assured without danger of undesirable overshoot in the output video waveform due to the incorporation of the shunt clipping diode 34 which assures that no portion of the output waveform may be inverted. Undesirable smear in the resulting presentation of the video signal on the P.P.I. screen is thus eliminated.

The present invention is thus seen to provide a simple iso-echo circuit providing exacting control of output direct-current level regardless of the particular iso threshold setting.

Although this invention has been described with respect to a particular embodiment thereof, it is not to be so limited as changes might be made therein which are within the fully intended scope of the invention as defined in the appended claims.

I claim:
1. A signal translating circuit comprising first voltage clamping means, an input terminal for connecting an input signal to said first voltage clamping means, said first voltage clamping means being adapted to clamp said input signal to ground potential, an electron discharge device having an input electrode and an output electrode, threshold sensitive coupling means connecting the output from said first voltage clamping means to the input electrode of said electron discharge device, said coupling means being adapted to pass only those portions of the signal from said voltage clamping means which exceed a predetermined threshold, voltage dividing means including first and second input terminals and an output terminal, second voltage clamping means connected to the output electrode of said electron discharge device, said second voltage clamping means being adapted to clamp the signal from said output electrode to ground potential, means connecting the ground clamped output from said second voltage clamping means to the first input terminal of said voltage dividing means, means coupling the output from said first voltage clamping means to the second input terminal of said voltage dividing means, said voltage dividing means being adapted to produce a voltage at the output terminal thereof proportional to the differential between the input voltages applied to the first and second input terminals thereof, and further voltage clamping means operably connected to said voltage dividing means to clamp the output from said voltage dividing means at ground potential, whereby those portions of said input signal exceeding said predetermined threshold are cancelled to zero at the output terminal of said voltage dividing means.

2. A signal translating device as defined in claim 5 wherein said threshold sensitive coupling means comprises a unilateral conduction device and means associated therewith for reverse biasing said device as a function of current flow through said electron discharge device.

3. A signal translating device as defined in claim 2 wherein said electron discharge device includes a grid input electrode, a cathode electrode, and a plate output electrode; and said associated reverse biasing means comprises a first resistive network connected between the grid of said electron discharge device and ground, a second resistive network connected between the cathode of said electron discharge device and ground, a portion of said first and second resistive networks being interconnected and the interconnected portion of at least one of said resistive networks being selectively variable in magnitude.

4. A signal translating device as defined in claim 3 further comprising switching means connected between said selectively variable resistive network portion and ground, control means for said switching means to effect first and second positions thereof, said first and second resistive networks being predetermined such that in said first position of said switching means said unilateral conduction device is reverse-biased in excess of the magnitude of said input signal, and in said second position of said switching means said unilateral conduction device is reverse-biased to a preselected lesser degree to permit those portions of said input signal with magnitude exceeding said lesser reverse bias to be applied to the input electrode of said electron discharge device.

5. A signal translating circuit comprising an input terminal, an input signal applied to said input terminal, first voltage clamping means connected to said input terminal and adapted to clamp said input signal to a reference potential, voltage dividing means including first and second input terminals and an output terminal, said reference clamped input signal connected to the first terminal of said voltage dividing means, threshold sensitive signal amplifying means, said amplifying means connected to said first voltage clamping means and adapted to selectively translate those portions of said reference clamped input signal exceeding a predetermined magnitude with respect to said reference potential, second voltage clamping means connected to the output of said amplifying means and adapted to clamp said selectively translated portions of said input signal to said reference potential, means connecting the output from said second voltage clamping means to the second terminal of said voltage dividing means, third voltage clamping means operably connected to said voltage dividing means and adapted to clamp the voltage appearing at the output terminal of said voltage dividing means to said reference potential whereby said threshold exceeding portions of said input signal appear as said reference potential at the output terminal of said voltage dividing means.

References Cited in the file of this patent

UNITED STATES PATENTS

| | | |
|---|---|---|
| 2,658,180 | De Boisblanc | Nov. 3, 1953 |
| 2,786,993 | Reid | Mar. 26, 1957 |
| 2,832,886 | Morrill | Apr. 28, 1958 |
| 2,859,437 | Atlas | Nov. 4, 1958 |

UNITED STATES PATENT OFFICE
CERTIFICATE OF CORRECTION

Patent No. 2,996,678                                        August 15, 1961

Paul M. Cunningham

It is hereby certified that error appears in the above numbered patent requiring correction and that the said Letters Patent should read as corrected below.

Column 4, line 41, for the claim reference numeral "5" read -- 1 --.

Signed and sealed this 3rd day of July 1962.

(SEAL)
Attest:

ERNEST W. SWIDER                                      DAVID L. LADD
Attesting Officer                                          Commissioner of Patents